United States Patent [19]
Levy

[11] Patent Number: 5,168,007
[45] Date of Patent: Dec. 1, 1992

[54] ANIMAL BLANKET

[76] Inventor: Harry Levy, 219-04 Stewart Rd., Hollis Hills, N.Y. 11427

[21] Appl. No.: 879,990

[22] Filed: May 8, 1992

[51] Int. Cl.$^5$ .............................................. B32B 7/00
[52] U.S. Cl. .................................... 428/248; 54/79.1; 428/246; 428/249; 428/252; 428/253; 428/423.1; 428/425.1
[58] Field of Search .................... 54/79; 428/246, 248, 428/249, 252, 253, 423.1, 425.1

[56] References Cited

U.S. PATENT DOCUMENTS

| | | | |
|---|---|---|---|
| 3,496,042 | 2/1970 | Wyness | 428/249 |
| 3,684,639 | 8/1972 | Keberle et al. | 428/246 |
| 4,382,108 | 5/1983 | Carroll et al. | 428/425.1 |
| 4,539,255 | 9/1985 | Sato et al. | 428/252 |
| 4,846,822 | 7/1989 | Foxman | 428/246 |
| 4,869,952 | 9/1989 | Levy | 428/253 |

Primary Examiner—James J. Bell
Attorney, Agent, or Firm—Charles I. Brodsky

[57] ABSTRACT

The animal blanket of the invention is a waterproof, windproof and breathable blanket and which exhibits a high resistance to mildew. The blanket is of a 3-layer construction, incorporating a first layer of woven or knit fabric material selected for durability so as to allow the blanket to be washed and reused. The second layer, of polyurethane film, is laminated to the first layer with a urethane adhesive, and preferably is of an aromatic, flexible composition. The third layer is of a cotton fabric, to serve as the lining for the blanket, and is laminated to the second layer, also with a urethane adhesive. Particularly suited for such large animals as "horses", the blanket can be employed for smaller animals as well, continuing to be usable even after hundreds of commercial washing cycles and dryings.

10 Claims, 1 Drawing Sheet

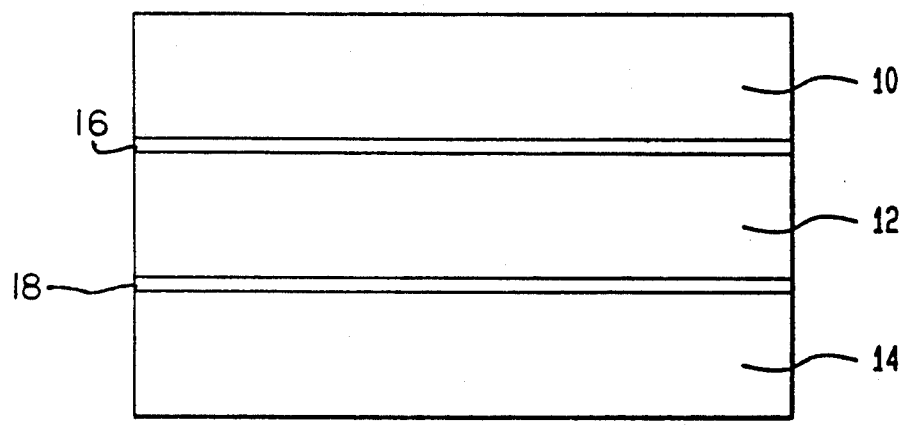

ANIMAL BLANKET

FIELD OF THE INVENTION

This invention relates to animal blankets and, more particularly, to such constructions useful for "horses" and other field animals.

BACKGROUND OF THE INVENTION

As is well known and understood, large investments are made in the breeding and raising of thoroughbred racehorses. As is also well known and understood, these animals are pampered and cared for almost regardless of expense. It is thus not unusual to see blankets draped around them during cold-weather seasons, to keep them warm. Such blankets are also very quickly placed around them after they have had a workout, and are otherwise perspiring. As is further appreciated, even such animals, working on the range, are covered at night by the rider to keep them from being chilled, and from catching cold.

As is also well known, the use of animal blankets also extends to such household pets as pedigreed dogs. It is not unusual, for example, to see these breeds being walked along the street by their master, with a fine coat of blanket material surrounding them so as to keep them warm in colder climates.

As will be appreciated, it would be desirable to have such blankets to be both comfortable to wear, and protective in use. It would also be desirable to have such blankets as can be readily and commercially washed and cleaned, so as to be durable and wearable after such harsh use and cleaning.

SUMMARY OF THE INVENTION

As will become clear hereinafter, the animal blanket of the invention is essentially a waterproof, windproof and breathable blanket, which exhibits a high resistance to mildew. As will be seen, the blanket is of a 3-layer construction, incorporating a first layer of woven or knit fabric material selected for durability so as to allow the blanket to be washed and reused. The second layer, of polyurethane film, will be seen to be laminated to the first layer with a urethane adhesive, preferably of an aromatic, flexible composition. The third layer will then be seen to be of a cotton fabric—to serve as the lining for the blanket —, likewise being laminated to the second layer with a urethane adhesive. With the third layer being structured to be in contact with the body of the animal, and with the second layer exhibiting a high leakage, preventing characteristic, the animal blanket of the invention provides a leak-proof and breathable construction, which is comfortable to wear, and which is sufficiently durable to withstand hundreds of commercial washing cycles and dryings so as to lend a high degree of reusability to the blanket.

BRIEF DESCRIPTION OF THE DRAWINGS

These and other features of the invention will be more clearly understood from a consideration of the following description, taken in connection with the sole FIGURE of the Drawing indicative of the construction of the animal blanket which is, at the same time, reusable, leak-proof, comfortable, breathable and durable.

DETAILED DESCRIPTION OF THE DRAWING

In accordance with the present invention, a 3-layer fabric is described which offers the features of being waterproof, windproof, leak-proof, breathable and durable even after many cycles of commercial washings and dryings. The first layer (shown by the reference numeral 10) is selected of a woven or knit fabric material selected to exhibit a high durability characteristic for use. In a preferred embodiment, a woven fabric constructed of 21 oz/yd$^2$ canvas woven fabric was employed, although different weights may be used, depending upon the size of animal to be covered. Alternatively, a nylon shell woven fabric could be employed, as well as other denier nylons of a characteristic to make the fabric durable and washable. A 100% cotton denim fabric could also be used. It will be appreciated by those skilled in the art that it is this layer 10 which will be exposed to the atmosphere in wearing.

Also shown in the drawing is a leakage-preventing portion of the blanket, composed of the second layer 12—it be understood that the first layer 10 could absorb a high degree of rain, snow, or other moisture during wearing. In accordance with the invention, this second layer 12 is selected to prevent passage of this moisture liquid in making the blanket waterproof.

In further accordance with the invention, this second layer 12 is composed of a polyurethane film, preferably 0.05 mm–0.20 mm thick—of an aromatic material, and to exhibit a high degree of flexibility for comfortable wearing.

The third layer 14, according to the invention, may be a cotton fabric which serves as the lining for the blanket, and which is structured to be in contact with the body of the animal. As will be apparent, the weight and construction of this lining can be selected in accordance with the design of the blanket and with the requirements of the animal in mind.

In accordance with a preferred embodiment of the invention, the first and second layers 10-12, and the second and third layers 12-14, are each laminated together with a non-flammable solvent-based urethane adhesive. In a preferred embodiment of the invention, such adhesive mixture was formed of the composition:

(1) polyurethane adhesive of viscosity 6,000 cps±2,000 cps —39.2% by weight;

(2) polyurethane adhesive of viscosity 27,000 cps±2,500 cps —39.2% by weight;

(3) polyurethane adhesive of viscosity 8,000 cps±2,000 cps —9.8% by weight;

(4) polyurethane adhesive of viscosity 5,000 cps±2,000 cps —11.8% by weight.

Such polyurethane adhesives are generally available, and manufactured by Soluol Chemical Company, Warwick, R.I. under the Tradenames Solubond 1177, Solubond 1173, Solubond 1168, and Solubond 1101, respectively. Any appropriate lamination technique may be employed in this manufacture, with or without curing. In one method of manufacturing the blanket of the invention, the layers 10 and 12 were first laminated together, allowed to sit, and then laminated to the third layer 14. More particularly, the layers 10 and 12 were first laminated, allowed to sit for 24 hours, and then cured using heat. The substrate so formed was then laminated to the third layer 14 by the polyurethane adhesive, again allowed to sit for 24 hours, at which time the entire structure was then heat cured once more.

These two adhesive laminations are respectively shown in the drawing by the reference numerals 16 and 18.

The resulting blanket composition has been found, through testing, to exhibit very many desirable advantages for its use. Firstly, it has been found to be 100% waterproof and 100% windproof, and exhibits a very high resistance to mildew. It has been found to be flexible and comfortable for wearing as a blanket, and has been tested to be quite washable and dry-cleanable—even to the extent that it can withstand in excess of 100 machine washings and dryings, commercially, in the presence of the organic liquids typically employed. The blanket proved out to be quite durable for reuse, and the aromatic nature of the polyurethane film 14 was found effective in combatting animal odor during wearing.

While there have been described what are considered to be preferred embodiments of the present invention, it will be readily apparent to those skilled in the art that modifications can be made without departing from the scope of the teachings herein. For at least such reason, therefore, resort should be had to the claims appended hereto for a true understanding of the scope of the invention.

I claim:

1. An animal blanket comprising:
   a first layer of one of woven or knit fabric material;
   a second layer of polyurethane film;
   a third layer of cotton fabric material;
   a first urethane adhesive joined between said first and second layers for laminating together said first and second layers;
   a second urethane adhesive joined between said second and third layers for laminating together said second and third layers;
   with said third layer, when said blanket is worn, structured to be in contact with the body of the animal.

2. The animal blanket of claim 1 wherein said first layer is selected to provide a high durability characteristic for reuse.

3. The animal blanket of claim 1 wherein said second layer is selected to provide a high flexibility characteristic for comfort when wearing.

4. The animal blanket of claim 3 wherein said second layer is selected to provide an aromatic characteristic to combat animal odor.

5. The animal blanket of claim 1 wherein said second layer is selected to provide a high fluid leakage-preventing characteristic.

6. The animal blanket of claim 1 wherein said first and second urethane adhesives incorporate a non-flammable solvent-based urethane adhesive.

7. The animal blanket of claim 1 wherein said first layer is one of canvas woven and nylon shell woven fabric.

8. The animal blanket of claim 1 wherein said first layer is of a denier nylon fabric.

9. The animal blanket of claim 1 wherein said second layer is of a thickness of 0.05 mm to 0.20 mm.

10. The animal blanket of claim 1 wherein said first and second urethane adhesives include adhesive mixtures composed of the formulation by weight of:
    polyurethane adhesive of viscosity 6,000 cps±2,000 cps —39.2%;
    polyurethane adhesive of viscosity 27,000 cps±2,500 cps —39.2%;
    polyurethane adhesive of viscosity 8,000 cps±2,000 cps —9.8%; and
    polyurethane adhesive of viscosity 5,000 cps±2,000 cps —11.8%.

* * * * *